United States Patent
Liu et al.

(10) Patent No.: US 9,961,358 B2
(45) Date of Patent: May 1, 2018

(54) METHOD AND APPARATUS FOR NON-SQUARE INTRA MODE CODING

(71) Applicant: MediaTek Singapore Pte. Ltd., Singapore (SG)

(72) Inventors: Shan Liu, San Jose, CA (US); Zhenzhong Chen, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 190 days.

(21) Appl. No.: 14/763,916

(22) PCT Filed: Apr. 9, 2014

(86) PCT No.: PCT/CN2014/074955
§ 371 (c)(1),
(2) Date: Jul. 28, 2015

(87) PCT Pub. No.: WO2014/166381
PCT Pub. Date: Oct. 16, 2014

(65) Prior Publication Data
US 2015/0365692 A1 Dec. 17, 2015

Related U.S. Application Data

(60) Provisional application No. 61/810,029, filed on Apr. 9, 2013.

(51) Int. Cl.
*H04N 7/12* (2006.01)
*H04N 19/50* (2014.01)
(Continued)

(52) U.S. Cl.
CPC ........... *H04N 19/50* (2014.11); *H04N 19/129* (2014.11); *H04N 19/157* (2014.11);
(Continued)

(58) Field of Classification Search
CPC .......................... H04N 19/159; H04N 19/176
See application file for complete search history.

(56) References Cited

U.S. PATENT DOCUMENTS

| 2008/0311920 A1 | 12/2008 | Xu et al. |
| 2011/0243230 A1 | 10/2011 | Liu |
| 2012/0230412 A1 | 9/2012 | Lee et al. |

FOREIGN PATENT DOCUMENTS

WO  WO 2013/160698  10/2013

OTHER PUBLICATIONS

Chen, Z., et al.; "AHG5 Intra Prediction Mode-Dependent Coefficient Scanning for 4:2:2 Chroma Extended Format;" Joint Collaborative Team on Video Coding (JCT-VC) of ITU-T SG 16 WP 3 and ISO/IEC JTC 1/SC 29/WG 11; Apr. 2013; pp. 1-4.

(Continued)

*Primary Examiner* — Young Lee
(74) *Attorney, Agent, or Firm* — McClure, Qualey & Rodack, LLP

(57) ABSTRACT

In a method and apparatus for predictive Intra coding of a non-square block using modified mode-dependent coefficient scanning (MDCS), the modified MDCS is derived from the MDCS that is designed for a square block. The mapped Intra modes for the non-square block are derived by mapping the Intra modes for the square block to the mapped Intra modes for the non-square block. The mapped Intra modes are divided into multiple groups including a first modified angular group and a second modified angular group. The modified MDCS modifies the number of the mapped Intra modes in the first modified angular group or the second modified angular group by comparing an angle spanned by the mapped Intra modes in the first modified angular group or the second modified angular group with the angle spanned by the corresponding Intra modes of the conventional MDCS.

9 Claims, 8 Drawing Sheets

(51) Int. Cl.
    *H04N 19/176*     (2014.01)
    *H04N 19/129*     (2014.01)
    *H04N 19/593*     (2014.01)
    *H04N 19/157*     (2014.01)
    *H04N 19/186*     (2014.01)

(52) U.S. Cl.
    CPC ......... *H04N 19/176* (2014.11); *H04N 19/186* (2014.11); *H04N 19/593* (2014.11)

(56) References Cited

OTHER PUBLICATIONS

Silcock, P., et al.; "AHG12 Extension of HM7 to Support Additional Chroma Formats;" Joint Collaborative Team on Video Coding (JCT-VC) of ITU-T SG 16 WP 3 and ISO/IEC JTC 1/SC 29/WG 11; Jul. 2012; pp. 1-16.

Peng, X., et al.; "CE6.b Report of Test 3 Interaction between SDIP and and MDCS;" Joint Collaborative Team on Video Coding (JCT-VC) of ITU-T SG 16 WP 3 and ISO/IEC JTC 1/SC 29/WG 11; Jul. 2011; pp. 1-10.

Zheng, Y., et al.; "CE11 Mode Dependent Coefficient Scanning;" Joint Collaborative Team on Video Coding (JCT-VC) of ITU-T SG 16 WP 3 and ISO/IEC JTC 1/SC 29/WG 11; Jan. 2011; pp. 1-6.

International Search Report dated Jul. 1, 2014, issued in application No. PCT/CN2014/074955.

Diagonal Scanning

Horizontal Scanning

Vertical Scanning

METHOD AND APPARATUS FOR NON-SQUARE INTRA MODE CODING

CROSS REFERENCE TO RELATED APPLICATIONS

The present invention is a National Phase Application of PCT Application No. PCT/CN2014/074955, filed on Apr. 9, 2014, which claims priority to U.S. Provisional Patent Application Ser. No. 61/810,029, filed on Apr. 9, 2013, entitled "Methods and Apparatus for Mode Coding". The priority applications are hereby incorporated by reference in their entireties.

TECHNICAL FIELD

The present invention relates to video coding. In particular, the present invention relates to coding techniques associated with Intra prediction for non-square blocks using mode-dependent coefficient scanning (MDCS).

BACKGROUND

Intra prediction exploits spatial correlation within a picture or within a picture region. In order to improve coding efficiency, the emerging High-Efficiency Video Coding (HEVC) standard exploits block-based spatial prediction extensively. In HEVC, multiple Intra prediction modes are used to exploit spatial features and the number of Intra prediction modes depends on the block size of a Prediction Unit (PU). In the HEVC standard, angular Intra prediction supports 33 distinct prediction directions along with a Planar mode (i.e., mode 0) and a DC mode (i.e., mode 1) as shown in FIG. 1. The mode numbers from 2 through 34 are associated with angular prediction. Mode 2 through mode 18 cover prediction directions from −135° to −45°, where mode 2 corresponds to −135° direction, mode 18 corresponds to −45° direction and mode 10 corresponds to −90° direction. Mode 18 through mode 34 cover prediction directions from −45° to +45°, where mode 26 corresponds to 0° direction and mode 34 corresponds +45° direction. There are four Intra prediction block sizes including 4×4, 8×8, 16×16 and 32×32. The decoder supports 132 combinations of block size and prediction direction.

HEVC adopts Intra prediction mode-dependent coefficient scanning (MDCS) for 4×4 and 8×8 transform blocks, where the scanning order of transform coefficients is determined by the Intra prediction mode. The scanning patterns for an 8×8 transform block, including diagonal coefficient scanning, horizontal coefficient scanning and vertical coefficient scanning, are shown in FIG. 2. For Intra prediction angular modes 6-14, vertical coefficient scanning is applied to the underlying square transform block. For Intra prediction angular modes 22-30, horizontal coefficient scanning is applied to the underlying square transform block. For the rest modes, diagonal coefficient scanning is applied. FIG. 3 illustrates the mode-dependent (or mode-derived) coefficient scanning patterns for an 8×8 transform block according to the conventional MDCS of the HEVC standard, where modes in range 310 use vertical coefficient scanning, modes in range 320 use horizontal coefficient scanning, and the rest modes use diagonal coefficient scanning.

In HEVC Range Extension, 4:2:2 color subsampling pattern is supported, where a chroma block collocated with a 2N×2N luma block has a size N×2N. The angular Intra modes for an N×2N chroma block are shown in FIG. 4, where the Intra modes for the non-square block are derived by mapping the Intra modes for the square block to the Intra modes (named mapped Intra modes) for the non-square block. The Intra prediction MDCS for the chroma components is the same as that for the luma component. As shown in FIG. 4, mapped Intra prediction angular modes 6-14 for the chroma components cover a much wider angle 410 than Intra prediction angular modes 22-30 for the luma component 420. This also applies to general N×2N luma as well as chroma intra block prediction. In one example, a 2N×2N intra coding unit (CU) may be split into two N×2N prediction units. In some cases, a 2N×N prediction block may also be derived from a 2N×2N coding or prediction block. For example, a 2N×N block may be generated from a 2N×2N block in a scalable coding system, where 2:1 scaling is performed in the vertical direction. In another example, a 2N×2N intra coding unit (CU) is split into two 2N×N intra prediction units. The MDCS method may be applied to the non-square blocks in the scalable coding system as shown in FIG. 5. As shown in FIG. 5, mapped Intra prediction angular modes 6-14 for the chroma components cover a much narrower angle 510 than Intra prediction angular modes 22-30 for the luma component 520. The original MDCS design is tailored for the Intra predictive coding of luma component with square block sizes. Therefore, if the same MDCS design is applied to the non-square blocks of chroma components, the performance may be degraded. Therefore, it is desirable develop Intra coding suited for non-square blocks.

SUMMARY

A method and apparatus for predictive Intra coding of a non-square block using modified mode-dependent coefficient scanning (MDCS) are disclosed. The modified MDCS is derived from the MDCS designed for a square block, where the Intra modes for the square block are divided into multiple groups comprising a first angular group and a second angular group. The square block is processed using first coefficient scanning if the Intra mode for the square block belongs to the first angular group and using second coefficient scanning if the Intra mode for the square block belongs to the second angular group. Embodiments according to the present invention modify the MDCS for the non-square block to improve the performance. The mapped Intra modes for the non-square block are derived by mapping the Intra modes for the square block to the mapped Intra modes for the non-square block. The mapped Intra modes are divided into multiple modified groups comprising a first modified angular group and a second modified angular group. The modified MDCS modifies the number of the mapped Intra modes in the first modified angular group or the second modified angular group by comparing an angle spanned by the mapped Intra modes in the first modified angular group or the second modified angular group with the angle spanned by the Intra modes in the first angular group or the second angular group respectively. A current non-square block is then processed according to the modified MDCS, where the current non-square block is Intra coded using the first coefficient scanning if the mapped Intra mode for the current non-square block belongs to the first modified angular group, and the current non-square block is Intra coded using the second coefficient scanning if the mapped Intra mode for the current non-square block belongs to the second modified angular group.

In one embodiment, the modified MDCS increases the number of the mapped Intra modes in the first modified angular group or the second modified angular group if the first angle is smaller than the second angle and the modified MDCS decreases the number of the mapped Intra modes in the first modified angular group or the second modified angular group if the first angle is larger than the second angle. The first coefficient scanning may correspond to horizontal coefficient scanning and the second coefficient scanning may correspond to vertical coefficient scanning. The modified MDCS can be applied to the Range Extension profile of the High Efficiency Video Coding (HEVC) standard. In HEVC, the Intra modes having mode 2 through mode 18 covers from −135 degree direction to −45 degree direction, mode 10 corresponds to −90 degree direction, and the first angular group consists of the Intra modes having mode 6 through mode 14. The first modified angular group according to one embodiment consists of the mapped Intra modes having mode from 8 through mode 12. In HEVC, the Intra modes having mode 18 through mode 34 covers from −45 degree direction to +45 degree direction, mode 26 corresponds to 0 degree direction, and the second angular group consists of the Intra modes having mode 22 through mode 30. The second modified angular group according to another embodiment consists of the mapped Intra modes having mode from 18 through mode 34.

If the mapped Intra mode for the non-square block is in neither the first modified angular group nor the second modified angular group, the non-square block is Intra coded using diagonal coefficient scanning. The square block may correspond to a 2N×2N luma block in a picture using 4:2:2 color sub-sampling, and the non-square block corresponds to an N×2N or 2N×N chroma block, wherein N is a positive integer. For example, N may be 2 or 4.

DETAILED DESCRIPTION

As mentioned before, the Intra prediction mode-dependent coefficient scanning (MDCS) for HEVC Range Extension profile is based on a square block. When the MDCS is applied to non-square blocks, the performance may be degraded. Embodiments according to the present invention adjust the range of angular Intra modes designed for a square block and use the result for a non-square block. The angle spanned by the adjusted range of Intra angular modes for the non-square block according to the present invention will be closer to the angle spanned by the range of Intra angular modes for the square block.

Figure 1:
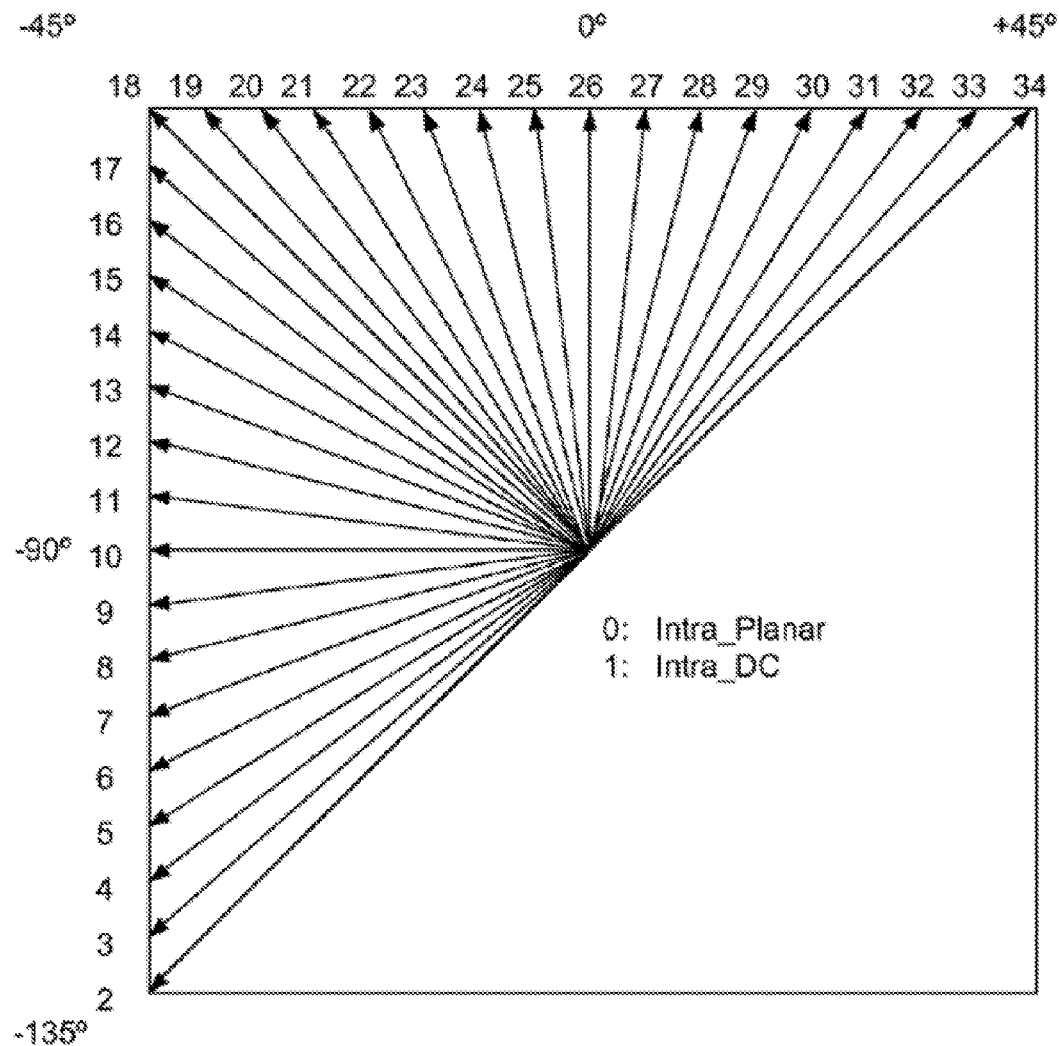
FIG. 1 illustrates the 35 Intra prediction modes for High-Efficiency Video Coding (HEVC).
Figure 2:
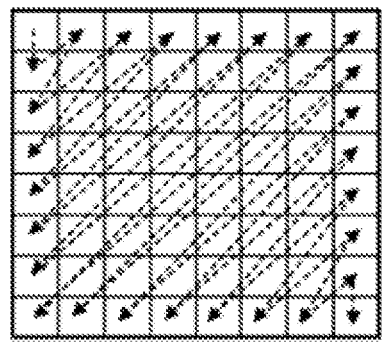
FIG. 2 illustrates examples of 8×8 coefficient scanning patterns for High-Efficiency Video Coding (HEVC).
Figure 2:
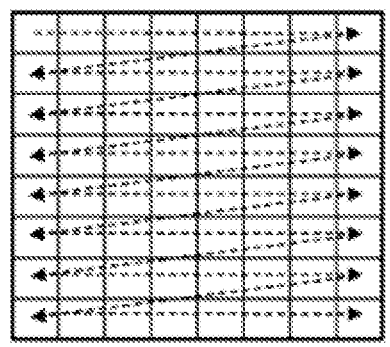
Figure 2:
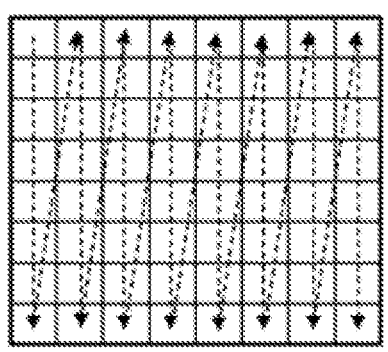
Figure 3:
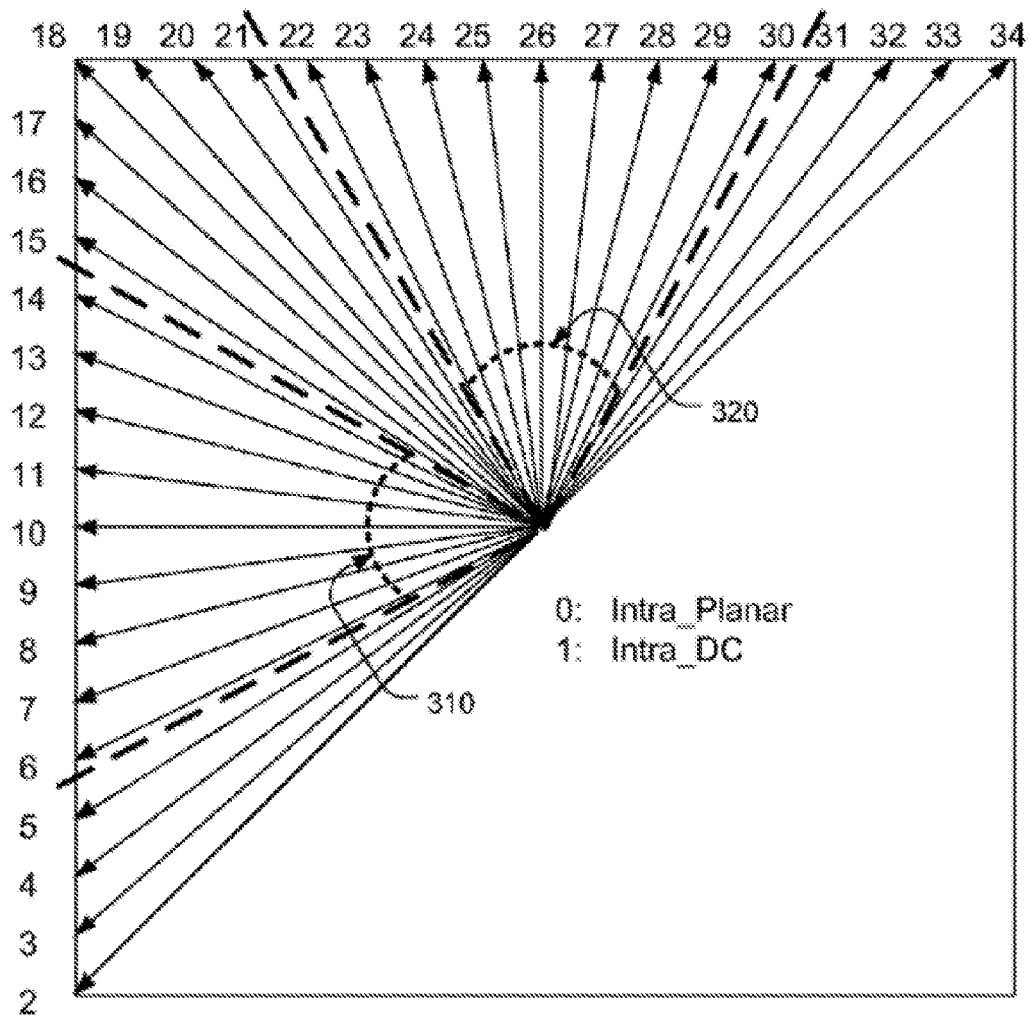
FIG. 3 illustrates an example of mode-dependent coefficient scanning (MDCS) based on High-Efficiency Video Coding (HEVC).
Figure 4:
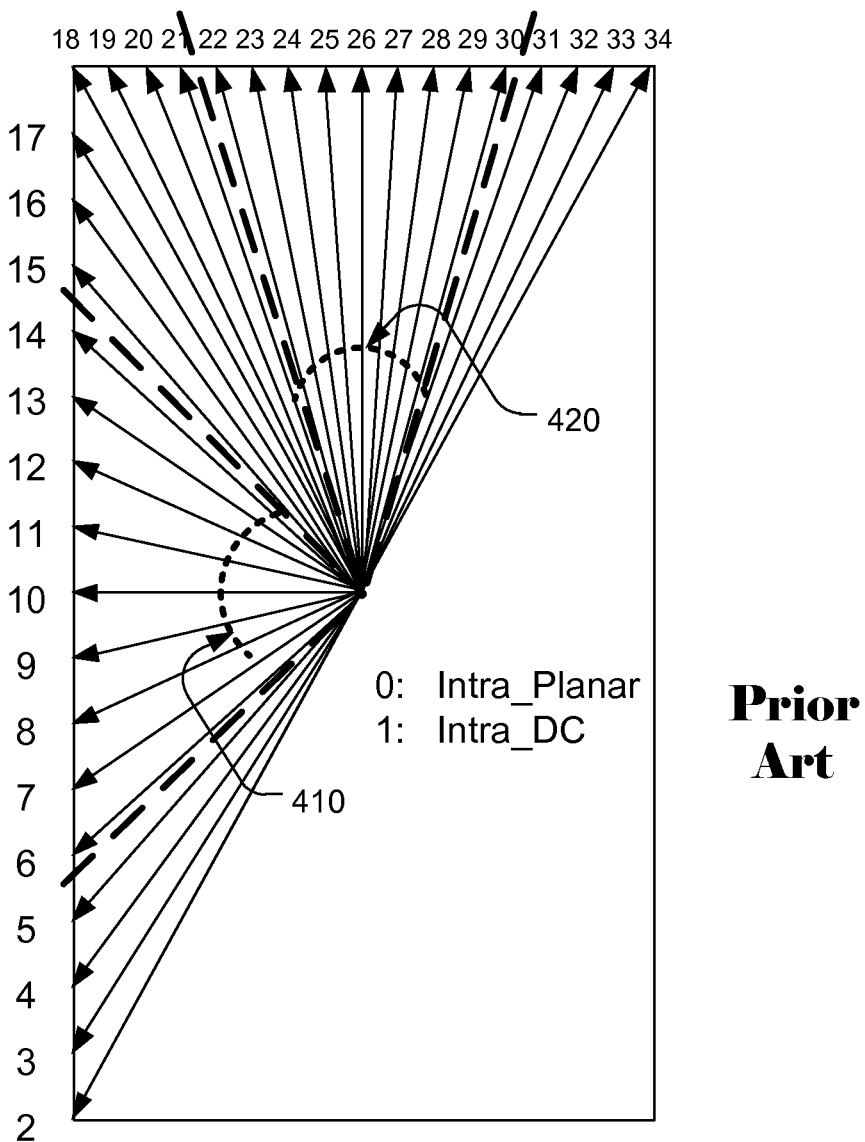
FIG. 4 illustrates an example of mode-dependent coefficient scanning (MDCS) for an N×2N non-square block based on High-Efficiency Video Coding (HEVC).
Figure 6:
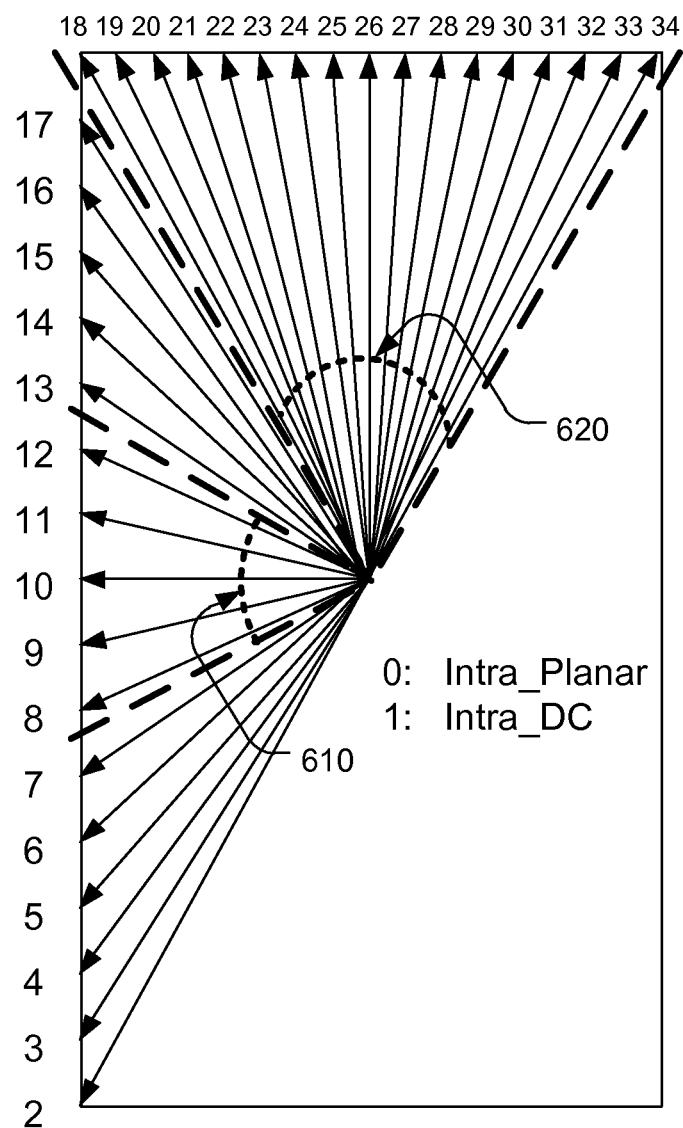
FIG. 6 illustrates an example of modified mode-dependent coefficient scanning (MDCS) for an N×2N non-square block according to an embodiment of the present invention.

An example incorporating an embodiment of the present invention is demonstrated for YCbCr 4:2:2 color sub-sampling. Each chroma block (Cr or Cb) associated with a 2N×2N luma block has a size N×2N. For the square luma block, vertical scan is applied to blocks having Intra modes 6-14. According to the conventional approach, vertical scan is also applied to mapped Intra modes 6-14 for the non-square chroma blocks. By comparing FIG. 1 with FIG. 4, the angle (410) spanned by mapped Intra modes 6-14 for the non-square chroma blocks is much wider than the angle (310) spanned by Intra modes 6-14 for the square luma blocks. On the other hand, the angle (420) spanned by mapped Intra modes 22-30 for the non-square chroma blocks is much narrower than the angle (320) spanned by Intra modes 22-30 for the square luma blocks. Intra mode 14 for the square luma block as shown in FIG. 1 has an angular direction closer to mapped Intra mode 12 for the non-square chroma block as shown in FIG. 4. Similarly, Intra mode 6 for the square luma block as shown in FIG. 1 has an angular direction closer to mapped Intra mode 8 for the non-square chroma block as shown in FIG. 4. Therefore, vertical coefficient scanning according to an embodiment of the present invention is applied to N×2N chroma blocks having Intra modes 8-12. For horizontal coefficient scanning, angle spanned by Intra modes 22-30 for the square luma blocks is close to angle spanned by mapped Intra modes 18-34 for the non-square chroma blocks. Therefore, horizontal coefficient scanning is applied to mapped Intra modes 18-34 for the non-square N×2N chroma blocks according to an embodiment of the present invention. Diagonal coefficient scanning is then applied to the rest mapped Intra modes for the non-square chroma blocks. The modified MDCS according to an embodiment of the present invention for the N×2N non-square blocks is illustrated in FIG. 6. The angles (610 and 620) spanned by the mapped Intra modes for vertical and horizontal coefficient scanning according to an embodiment of the present invention are closer to the angles of the original MDCS for square blocks. The scanning patterns and corresponding mapped Intra modes for the N×2N non-square blocks according to an embodiment of the present invention are summarized in Table 1.

TABLE 1

| DM modes | Coefficient scanning |
| --- | --- |
| 8-12 | Vertical |
| 18-34 | Horizontal |
| All other modes | Diagonal |

In another example, 2N×N non-square prediction blocks are derived from the 2N×2N square coding blocks. For a square luma block, vertical scan is applied to blocks having Intra modes 6-14. According to the conventional approach, vertical coefficient scanning would be applied to mapped Intra modes 6-14 for the non-square blocks. By comparing FIG. 1 with FIG. 5, the angle (510) spanned by mapped Intra modes 6-14 for the non-square chroma blocks is much narrower than the angle (310) spanned by Intra modes 6-14 for the square luma blocks. On the other hand, the angle (520) spanned by mapped Intra modes 22-30 for the non-square chroma blocks is much wider than the angle (320) spanned by Intra modes 22-30 for the square luma blocks.

Figure 5:
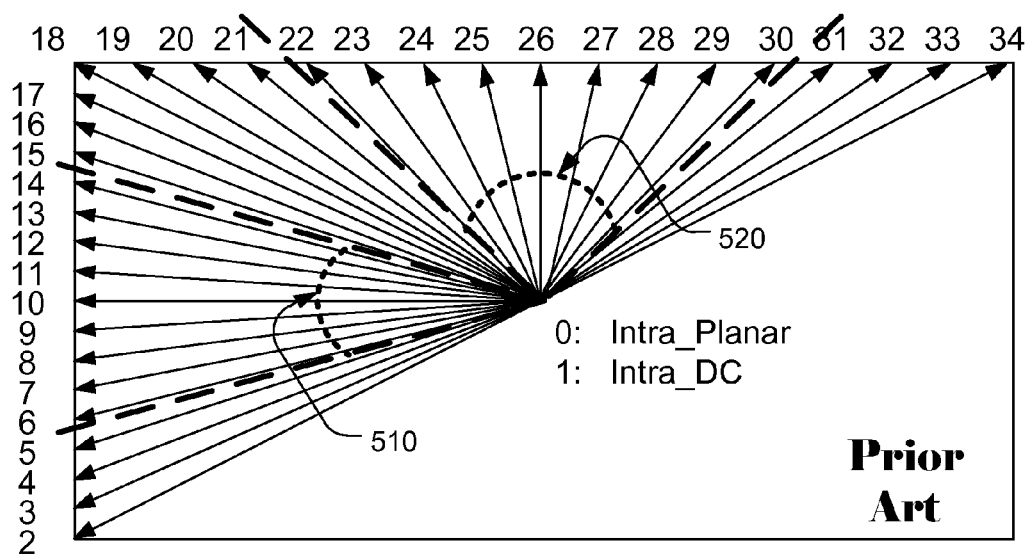
FIG. 5 illustrates an example of mode-dependent coefficient scanning (MDCS) for a 2N×N non-square block based on High-Efficiency Video Coding (HEVC).
Figure 7:
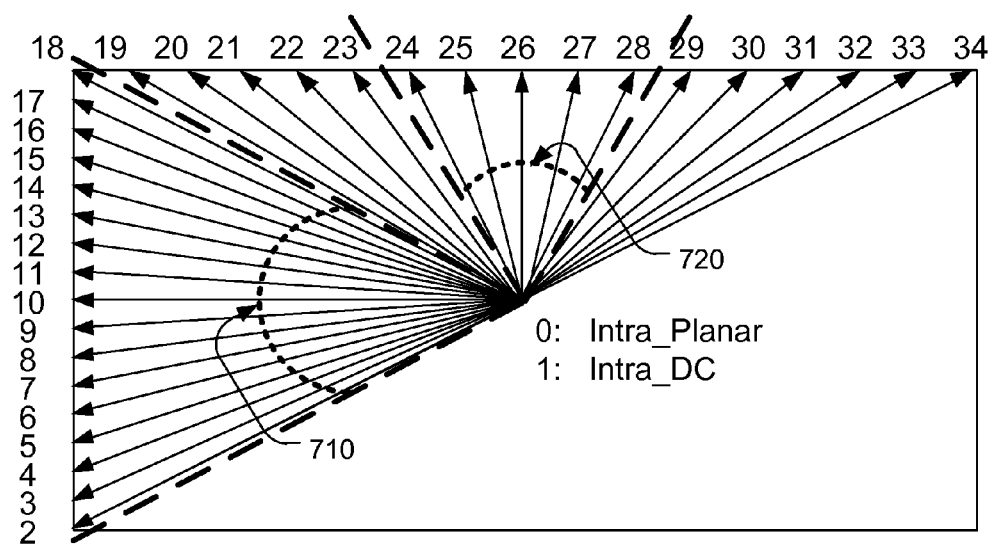
FIG. 7 illustrates an example of modified mode-dependent coefficient scanning (MDCS) for a 2N×N non-square block according to an embodiment of the present invention.

Intra mode 14 for the square block as shown in FIG. 1 has an angular direction closer to mapped Intra mode 18 for the non-square block as shown in FIG. 5. Similarly, Intra mode 6 for the square block as shown in FIG. 1 has an angular direction closer to mapped Intra mode 2 for the non-square block as shown in FIG. 5. Therefore, vertical coefficient scanning according to an embodiment of the present invention is applied to 2N×N non-square blocks having Intra modes 2-18. For horizontal coefficient scanning, angle spanned by Intra modes 22-30 for the square blocks is close to angle spanned by mapped Intra modes 24-28 for the non-square blocks. Therefore, horizontal coefficient scanning is applied to mapped Intra modes 24-28 for the non-square blocks according to an embodiment of the present invention. Diagonal coefficient scanning is then applied to the rest mapped Intra modes for the non-square blocks. The modified MDCS according to an embodiment of the present invention for the 2N×N non-square blocks is illustrated in FIG. 7. The angles (710 and 720) spanned by the mapped Intra modes for vertical and horizontal coefficient scanning according to an embodiment of the present invention are closer to the angles of the original MDCS for square blocks. The scanning patterns and corresponding mapped Intra modes for the 2N×N non-square blocks according to an embodiment of the present invention are summarized in Table 2.

TABLE 2

| DM modes | Coefficient scanning |
|---|---|
| 2-18 | Vertical |
| 24-28 | Horizontal |
| All other modes | Diagonal |

The modified MDCS can be applied to pictures having YCrCb422 or YUV422 color sub-sampling in the Range Extension profile of the HEVC. The chroma block corresponding to a 2N×2N luma block is non-square with a size N×2N. The modified MDCS for the N×2N chroma block is shown in Table 1. Accordingly, if the mapped Intra mode for the N×2N chroma block is from mode 8 to mode 12, vertical coefficient scanning is applied to the N×2N chroma block. If the mapped Intra mode for the N×2N chroma block is from mode 18 to mode 34, horizontal coefficient scanning is applied to the N×2N chroma block. For other mapped Intra modes, diagonal coefficient scanning is applied to the N×2N chroma block.

The performance for Intra coding using modified MDCS for non-square blocks according to an embodiment of the present invention is compared to that using conventional MDCS. The comparisons of bitrate performance for system configurations corresponding to All Intra Main-tier, All Intra High-tier and All Intra Super-High-tier based on various test video materials are shown in Table 3, where a negative number means improvement over the conventional MDCS based on HEVC. As shown in Table 3, an improvement of 0.1% has been achieved for All Intra Main-tier and All Intra High-tier. For Intra Super-High-tier, the performance is about the same.

TABLE 3

| | All Intra Main-tier | | All Intra High-tier | | All Intra Super-High-tier | |
|---|---|---|---|---|---|---|
| | U | V | U | V | U | V |
| Traffic | −0.20% | −0.30% | −0.10% | −0.20% | −0.10% | −0.10% |
| Kimono1 | −0.10% | −0.10% | 0.00% | −0.10% | 0.00% | 0.00% |
| EBUHorse | −0.10% | −0.20% | 0.00% | −0.10% | 0.00% | 0.00% |

TABLE 3-continued

| | All Intra Main-tier | | All Intra High-tier | | All Intra Super-High-tier | |
|---|---|---|---|---|---|---|
| | U | V | U | V | U | V |
| EBUGraphics | −0.20% | −0.20% | −0.10% | −0.10% | −0.10% | −0.10% |
| EBUWaterRocksClose | 0.00% | −0.10% | 0.00% | 0.00% | 0.00% | 0.00% |
| EBUKidsSoccer | −0.10% | −0.10% | 0.00% | 0.00% | 0.00% | 0.00% |
| Seeking | −0.10% | −0.10% | −0.10% | −0.10% | 0.00% | 0.00% |
| Overall | −0.10% | −0.20% | −0.10% | −0.10% | 0.00% | 0.00% |

The comparisons of bitrate performance for system configurations corresponding to Random Access Main-tier and Random Access High-tier based on various test video materials are shown in Table 4. As shown in Table 4, the improvement is between 0% and 0.1%.

TABLE 4

| | Random Access Main-tier | | Random Access High-tier | |
|---|---|---|---|---|
| | U | V | U | V |
| Traffic | −0.10% | −0.20% | 0.00% | −0.10% |
| Kimono1 | −0.10% | 0.00% | −0.10% | −0.10% |
| EBUHorse | 0.10% | 0.00% | 0.00% | −0.10% |
| EBUGraphics | −0.10% | −0.10% | 0.00% | 0.00% |
| EBUWaterRocksClose | 0.00% | 0.00% | 0.00% | 0.00% |
| EBUKidsSoccer | −0.10% | −0.30% | 0.00% | −0.20% |
| Seeking | −0.10% | −0.10% | −0.10% | 0.00% |
| Overall | −0.10% | −0.10% | 0.00% | −0.10% |

The comparisons of bitrate performance for system configurations corresponding to Low Delay Main-tier and Low Delay High-tier based on various test video materials are shown in Table 5. As shown in Table 5, the improvement is between 0% and 0.2%.

TABLE 5

| | Low delay B Main-tier | | Low delay B High-tier | |
|---|---|---|---|---|
| | U | V | U | V |
| Traffic | 0.00% | 0.10% | 0.00% | 0.00% |
| Kimono1 | 0.00% | −0.20% | 0.00% | −0.10% |
| EBUHorse | 0.00% | −0.50% | 0.00% | −0.50% |
| EBUGraphics | −0.20% | 0.10% | 0.00% | 0.10% |
| EBUWaterRocksClose | 0.00% | −0.20% | 0.00% | 0.00% |
| EBUKidsSoccer | −0.30% | −0.20% | −0.30% | −0.20% |
| Seeking | −0.10% | 0.00% | −0.10% | −0.10% |
| Overall | −0.10% | −0.10% | −0.10% | −0.10% |

Figure 8:
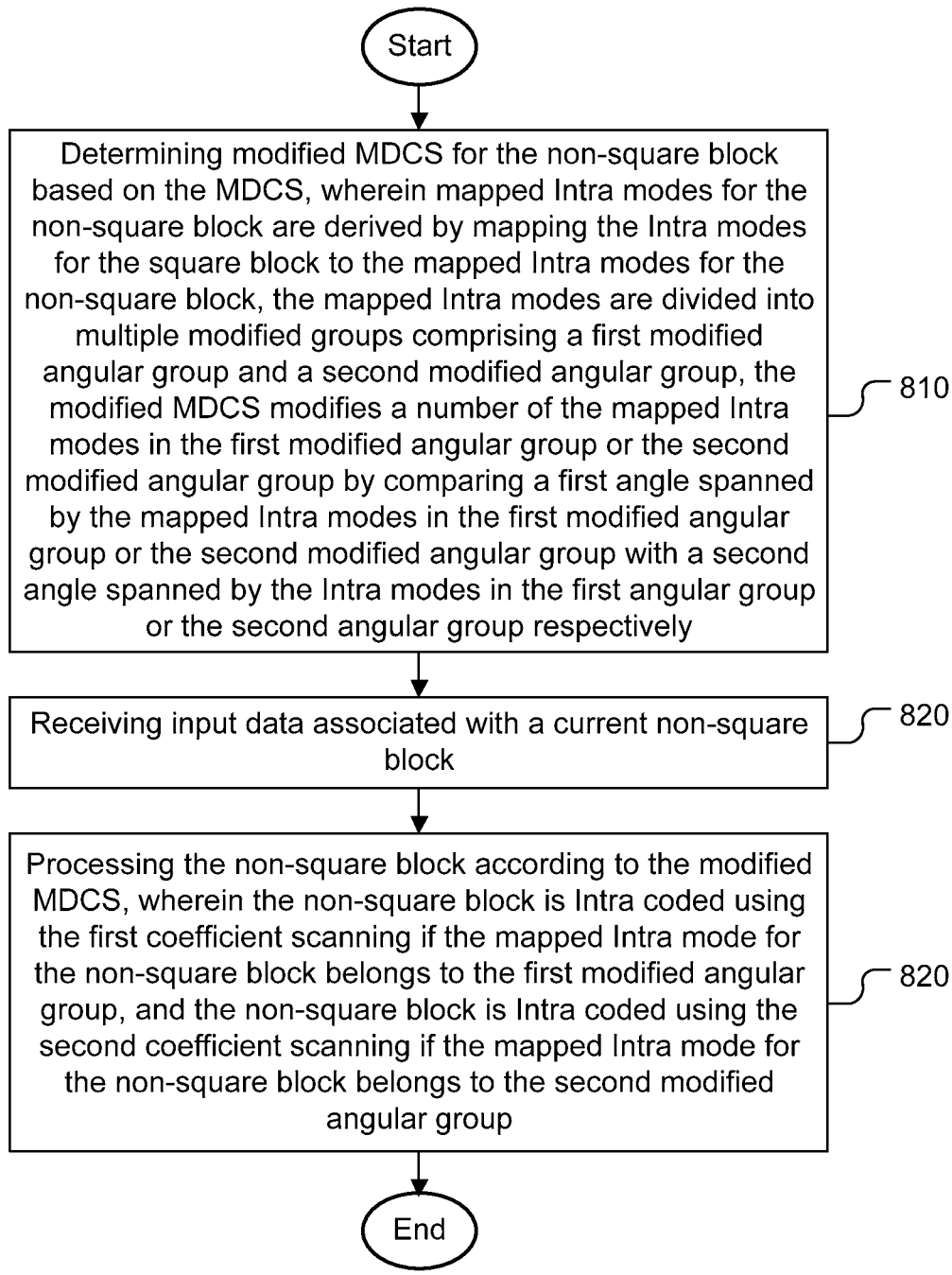
FIG. 8 illustrates an exemplary flowchart for a system incorporating modified mode-dependent coefficient scanning (MDCS) according to an embodiment of the present invention.

FIG. 8 illustrates an exemplary flowchart for a coding system that uses the modified MDCS for Intra predictive coding of non-square blocks. As mentioned before, the modified MDCS is derived from the MDCS designed for square blocks. Intra modes for the square blocks are divided into multiple groups comprising a first angular group and a second angular group. The square blocks are processed using first coefficient scanning if the Intra mode for the square block belongs to the first angular group and using second coefficient scanning if the Intra mode for the square block belongs to the second angular group. After the MDCS is determined, the modified MDCS is derived by modifying the conventional MDCS as shown in step 810. The modification is performed as follows. First, mapped Intra modes for the non-square block are derived by mapping the Intra modes for the square block to the mapped Intra modes for the non-square block. The mapped Intra modes are then divided into multiple modified groups comprising a first modified angular group and a second modified angular group. The modified MDCS modifies the number of the mapped Intra modes in the first modified angular group or the second modified angular group by comparing the angle spanned by the mapped Intra modes in the first modified angular group or the second modified angular group with the angle spanned by the Intra modes in the first angular group or the second angular group respectively. After the modified MDCS is determined, the system can process the non-square blocks. As shown in step 820, input data associated with a current non-square block is received. For encoding, the input data associated the current non-square block corresponds to the non-square pixel data to be coded. For decoding, the input data associated with the current non-square block corresponds to the coded current non-square block to be decoded. The motion information of the current texture block may be retrieved from memory (e.g., computer memory, buffer (RAM or DRAM) or other media) or from a processor. The current non-square block is processed according to the modified MDCS as shown in step 830, where the current non-square block is Intra coded using the first coefficient scanning if the mapped Intra mode for the current non-square block belongs to the first modified angular group, and the current non-square block is Intra coded using the second coefficient scanning if the mapped Intra mode for the current non-square block belongs to the second modified angular group.

The flowchart shown in FIG. 8 is intended for serving as examples of using modified MDCS for Intra predictive coding of non-square blocks according to embodiments of the present invention. A person skilled in the art may practice the present invention by modifying individual steps, splitting or combining steps with departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for predictive Intra coding of a non-square block, wherein a corresponding square block is Intra coded using mode-dependent coefficient scanning (MDCS), wherein Intra modes for the corresponding square block are divided into multiple groups comprising a first angular group and a second angular group, and wherein the corresponding square block is processed using first coefficient scanning if the Intra mode for the square block belongs to the first angular group and using second coefficient scanning if the Intra mode for the square block belongs to the second angular group, the method comprising:

obtaining mapped Intra modes for the non-square block, wherein the mapped Intra modes are associated with the Intra modes for the square block, and the mapped Intra modes are divided into multiple temporarily modified groups comprising a first temporarily modified angular group and a second temporarily modified angular group;

determining modified MDCS for the non-square block by modifying a number of the mapped Intra modes in the first temporarily modified angular group or the second temporarily modified angular group based on a comparison between a first angle spanned by the mapped Intra modes in the first temporarily modified angular group and a second angle spanned by the Intra modes in the first angular group, or based on a comparison between a third angle spanned by the mapped Intra modes in the second temporarily modified angular group and a fourth angle spanned by the Intra modes in the second angular group, wherein said modifying the number of the mapped Intra modes in the first temporarily modified angular group or the second temporarily modified angular group comprises at least one of:

adding one or more mapped Intra modes which are in neither the first temporarily modified angular group nor the second temporarily modified angular group into the first temporarily modified angular group to form a first modified angular group, adding one or more mapped Intra modes which are in neither the first temporarily modified angular group nor the second temporarily modified angular group into the second temporarily modified angular group to form a second modified angular group, deleting one or more mapped Intra modes from the first temporarily modified angular group to form the first modified angular group, and deleting one or more mapped Intra modes from the second temporarily modified angular group to form the second modified angular group;

receiving input data associated with a current non-square block; and processing the current non-square block according to the modified MDCS, wherein the current non-square block is Intra coded using the first coefficient scanning if the mapped Intra mode for the current non-square block belongs to the first modified angular group, and the current non-square block is Intra coded using the second coefficient scanning if the mapped Intra mode for the current non-square block belongs to the second modified angular group, wherein the modified MDCS increases the number of the mapped Intra modes in the first modified angular group or the second modified angular group if the first angle is smaller than the second angle and the modified MDCS decreases the number of the mapped Intra modes in the first modified angular group or the second modified angular group if the first angle is larger than the second angle;

wherein the first coefficient scanning corresponds to horizontal coefficient scanning and the second coefficient scanning corresponds to vertical coefficient scanning, wherein the square block corresponds to a 2N×2N block, and the non-square block corresponds to an N×2N block, wherein N is a positive integer, wherein the Intra modes having mode 2 through mode 18 covers from −135 degree direction to −45 degree direction, mode 10 corresponds to −90 degree direction, the first angular group consists of the Intra modes having mode 6 through mode 14, and the first modified angular group consists of the mapped Intra modes from mode 8 through mode 12, and wherein the Intra modes having mode 18 through mode 34 covers from −45 degree direction to +45 degree direction, mode 26 corresponds to 0 degree direction, the second angular group consists of the Intra modes having mode 22 through mode 30, and the second modified angular group consists of the mapped Intra modes from mode 18 through mode 34.

2. The method of claim 1, wherein the square block corresponds to a 2N×2N block, and the non-square block corresponds to a 2N×N block, wherein N is a positive integer.

3. The method of claim 2, wherein the Intra modes having mode 2 through mode 18 covers from −135 degree direction to −45 degree direction, mode 10 corresponds to −90 degree direction, the first angular group consists of the Intra modes having mode 6 through mode 14, and the first modified angular group consists of the mapped Intra modes from mode 2 through mode 18.

4. The method of claim 2, wherein the Intra modes having mode 18 through mode 34 covers from −45 degree direction to +45 degree direction, mode 26 corresponds to 0 degree direction, the second angular group consists of the Intra modes having mode 22 through mode 30, and the second modified angular group consists of the mapped Intra modes from mode 24 through mode 28.

5. The method of claim 1, wherein the non-square block is Intra coded using diagonal coefficient scanning if the mapped Intra mode for the non-square block is neither in the first modified angular group nor in the second modified angular group.

6. The method of claim 1, wherein the square block corresponds to a 2N×2N luma block in a picture using 4:2:2 color sub-sampling, and the non-square block corresponds to an N×2N chroma block, wherein N is a positive integer.

7. The method of claim 6, wherein N is 2 or 4.

8. An apparatus for predictive Intra coding of a non-square block, wherein a corresponding square block is Intra coded using mode-dependent coefficient scanning (MDCS), wherein Intra modes for the corresponding square block are divided into multiple groups comprising a first angular group and a second angular group, and wherein the corresponding square block is processed using first coefficient scanning if the Intra mode for the square block belongs to the first angular group and using second coefficient scanning if the Intra mode for the square block belongs to the second angular group, the apparatus comprising one or more electronic circuits, wherein said one or more electronic circuits are configured to:

obtain mapped Intra modes for the non-square block, wherein the mapped Intra modes are associated with the Intra modes for the square block, and the mapped Intra modes are divided into multiple temporarily modified groups comprising a first temporarily modified angular group and a second temporarily modified angular group;

determine modified MDCS for the non-square block by modifying a number of the mapped Intra modes in the first temporarily modified angular group or the second temporarily modified angular group based on a comparison between a first angle spanned by the mapped Intra modes in the first temporarily modified angular group and a second angle spanned by the Intra modes in the first angular group, or based on a comparison between a third angle spanned by the mapped Intra modes in the second temporarily modified angular group and a fourth angle spanned by the Intra modes in the second angular group, wherein said modifying the number of the mapped Intra modes in the first temporarily modified angular group or the second temporarily modified angular group comprises at least one of:

adding one or more mapped Intra modes which are in neither the first temporarily modified angular group nor the second temporarily modified angular group into the first temporarily modified angular group to form a first modified angular group, adding one or more mapped Intra modes which are in neither the first temporarily modified angular group nor the second temporarily modified angular group into the second temporarily modified angular group to form a second modified angular group, deleting one or more mapped Intra modes from the first temporarily modified angular group to form the first modified angular group, and deleting one or more mapped Intra modes from the second temporarily modified angular group to form the second modified angular group;

receive input data associated with a current non-square block; and process the current non-square block according to the modified MDCS, wherein the current non-square block is Intra coded using the first coefficient scanning if the mapped Intra mode for the current non-square block belongs to the first modified angular group, and the current non-square block is Intra coded using the second coefficient scanning if the mapped Intra mode for the current non-square block belongs to the second modified angular group, wherein the modified MDCS increases the number of the mapped Intra modes in the first modified angular group or the second modified angular group if the first angle is smaller than the second angle and the modified MDCS decreases the number of the mapped Intra modes in the first modified angular group or the second modified angular group if the first angle is larger than the second angle;

wherein the first coefficient scanning corresponds to horizontal coefficient scanning and the second coefficient scanning corresponds to vertical coefficient scanning, wherein the square block corresponds to a 2N×2N block, and the non-square block corresponds to an N×2N block, wherein N is a positive integer, wherein the Intra modes having mode 2 through mode 18 covers from −135 degree direction to −45 degree direction, mode 10 corresponds to −90 degree direction, the first angular group consists of the Intra modes having mode 6 through mode 14, and the first modified angular group consists of the mapped Intra modes from mode 8 through mode 12, and wherein the Intra modes having mode 18 through mode 34 covers from −45 degree direction to +45 degree direction, mode 26 corresponds to 0 degree direction, the second angular group consists of the Intra modes having mode 22 through mode 30, and the second modified angular group consists of the mapped Intra modes from mode 18 through mode 34.

9. A method for predictive Intra coding of a non-square block, wherein a corresponding square block is Intra coded using mode-dependent coefficient scanning (MDCS), wherein Intra modes for the corresponding square block are divided into multiple groups comprising a first angular group and a second angular group, and wherein the corresponding square block is processed using first coefficient scanning if the Intra mode for the square block belongs to the first angular group and using second coefficient scanning if the Intra mode for the square block belongs to the second angular group, the method comprising:

obtaining mapped Intra modes for the non-square block, wherein the mapped Intra modes are associated with the Intra modes for the square block, and the mapped Intra modes are divided into multiple temporarily modified groups comprising a first temporarily modified angular group and a second temporarily modified angular group;

determining modified MDCS for the non-square block by modifying a number of the mapped Intra modes in the first temporarily modified angular group or the second temporarily modified angular group based on a comparison between a first angle spanned by the mapped Intra modes in the first temporarily modified angular group and a second angle spanned by the Intra modes in the first angular group, or based on a comparison between a third angle spanned by the mapped Intra modes in the second temporarily modified angular group and a fourth angle spanned by the Intra modes in the second angular group, wherein said modifying the number of the mapped Intra modes in the first temporarily modified angular group or the second temporarily modified angular group comprises at least one of:

adding one or more mapped Intra modes which are in neither the first temporarily modified angular group nor the second temporarily modified angular group into the first temporarily modified angular group to form a first modified angular group, adding one or more mapped Intra modes which are in neither the first temporarily modified angular group nor the second temporarily modified angular group into the second temporarily modified angular group to form a second modified angular group, deleting one or more mapped Intra modes from the first temporarily modified angular group to form the first modified angular group, and deleting one or more mapped Intra modes from the second temporarily modified angular group to form the second modified angular group;

receiving input data associated with a current non-square block; and processing the current non-square block according to the modified MDCS, wherein the current non-square block is Intra coded using the first coefficient scanning if the mapped Intra mode for the current non-square block belongs to the first modified angular group, and the current non-square block is Intra coded using the second coefficient scanning if the mapped Intra mode for the current non-square block belongs to the second modified angular group, wherein the modified MDCS increases the number of the mapped Intra modes in the first modified angular group or the second modified angular group if the first angle is smaller than the second angle and the modified MDCS decreases the number of the mapped Intra modes in the first modified angular group or the second modified angular group if the first angle is larger than the second angle;

wherein the first coefficient scanning corresponds to horizontal coefficient scanning and the second coefficient scanning corresponds to vertical coefficient scanning, wherein the square block corresponds to a 2N×2N block, and the non-square block corresponds to a 2N×N block, wherein N is a positive integer, wherein the Intra modes having mode 2 through mode 18 covers from −135 degree direction to −45 degree direction, mode 10 corresponds to −90 degree direction, the first angular group consists of the Intra modes having mode 6 through mode 14, and the first modified angular group consists of the mapped Intra modes from mode 2 through mode 18, and wherein the Intra modes having mode 18 through mode 34 covers from −45 degree direction to +45 degree direction, mode 26 corresponds to 0 degree direction, the second angular group consists of the Intra modes having mode 22 through mode 30, and the second modified angular group consists of the mapped Intra modes from mode 24 through mode 28.

* * * * *